United States Patent [19]

Nochi

[11] Patent Number: 5,070,294
[45] Date of Patent: Dec. 3, 1991

[54] MULTI-OUTPUT DC-DC CONVERTER USING FIELD-EFFECT TRANSISTOR SWITCHED AT HIGH FREQUENCY

[75] Inventor: Hideo Nochi, Fukushima, Japan
[73] Assignee: NEC Corporation, Japan
[21] Appl. No.: 643,792
[22] Filed: Jan. 22, 1991

[30] Foreign Application Priority Data

Jan. 19, 1990 [JP] Japan .................................. 2-9718

[51] Int. Cl.⁵ ............................................. G05F 1/577
[52] U.S. Cl. .................................... 323/267; 323/282
[58] Field of Search ................ 323/282, 284, 285, 267

[56] References Cited

U.S. PATENT DOCUMENTS

| | | | |
|---|---|---|---|
| 3,671,853 | 6/1972 | Weischedel et al. | 323/267 |
| 4,521,725 | 6/1985 | Phaneuf | 323/282 |
| 4,673,865 | 6/1987 | Deluca et al. | 323/267 |

Primary Examiner—Peter S. Wong
Attorney, Agent, or Firm—Ostrolenk, Faber, Gerb & Soffen

[57] ABSTRACT

A multi-output DC-DC converter comprises a field-effect transistor connected to a one terminal of a DC voltage source, the transistor having a parasitic diode coupled in parallel relationship therewith. A resonant circuit is coupled at one end to the other terminal of the voltage source and a first diode is connected between the transistor and the other end of the resonant circuit to allow a forward current to flow therein. A second diode is connected in parallel with a series circuit formed by the transistor and the first diode to allow current to flow in a reverse direction, the second diode having a recovery time much smaller than the recovery time of the parasitic diode. A first rectifier-filter is coupled to the resonant circuit for developing a first DC output voltage, and a second rectifier-filter is coupled across the terminals of the DC voltage source through the transistor for developing a second DC output voltage. A third diode is connected between the DC voltage source and the second rectifier-filter for blocking a current flow which would otherwise flow through the first and second diodes and the second rectifier-filter. Deviations of the first and second DC output voltages respectively from a reference voltage are detected and the gate of the transistor is driven by switching pulses having a frequency variable as a function of the deviation of the first DC output voltage and having a duration variable as a function of the deviation of the second DC output voltage.

2 Claims, 4 Drawing Sheets

MULTI-OUTPUT DC-DC CONVERTER USING FIELD-EFFECT TRANSISTOR SWITCHED AT HIGH FREQUENCY

BACKGROUND OF THE INVENTION

The present invention relates to a multi-output DC-DC converter.

Multi-output DC-DC converters are known in the art. As shown and described in J. Sevastian, J. Uceda and F. Aldana, "New topologies of Fully Regulated Two-Output DC-to-DC Converters with Small Frequency Variation Range", I.E.E.E. PESC '86 Record, page 266, FIG. 5, a bipolar transistor is used for periodically switching an input DC voltage. First and second rectifier-filter circuits are provided. The first rectifier-filter receives the switched DC voltage through a resonant circuit to generate a first DC output voltage which varies at least as a function of the frequency at which the transistor is switched, and the second rectifier-filter receives the switched DC voltage direct to generate a second DC output voltage which varies at least as a function of the duration, or conduction period of the transistor. Deviations of the first and second DC outputs from a reference voltage are sensed and used to control the switching frequency and conduction period of the transistor to maintain the output voltages constant under varying input voltage and load current conditions. However, one drawback of the prior art is that, due to the speed limitations of the bipolar transistor, desired high speed switching cannot be achieved to generate high frequency oscillations. Another disadvantage is the delayed response of the transistor at the trailing edge of the switching pulse due to a current through a circuit connected in parallel with the transistor. As a result, the control range of the prior art multi-output DC-DC converter is not sufficient to cover the range of input-voltage and load-current variations.

SUMMARY OF THE INVENTION

It is therefore an object of the present invention to provide a multi-output DC-DC converter capable of being switched at high frequency with low energy loss and of providing a wide control range under varying input voltage and load current.

According to the present invention, there is provided a multi-output DC-DC converter which comprises a field-effect transistor having a source-drain path connected to a first terminal of an input DC voltage source, the transistor having a parasitic diode coupled in parallel relationship therewith. A resonant circuit is coupled at one end to a second terminal of the DC voltage source and a first diode is connected between the source-drain path of the transistor and the other end of the resonant circuit to allow current to flow therein in a forward direction. A second diode is connected in parallel with a series circuit formed by the source-drain path of the transistor and the first diode to allow current to flow in a reverse direction, the second diode having a recovery time much smaller than the recovery time of the parasitic diode. A first rectifier-filter is coupled to the resonant circuit for developing a first DC output voltage, and a second rectifier-filter is coupled across the first and second terminals of the DC voltage source through the transistor for developing a second DC output voltage. A third diode is connected between the DC voltage source and the second rectifier-filter for blocking a current flow which would otherwise flow through the first and second diodes and the second rectifier-filter. Deviations of the first and second DC output voltages respectively from a reference voltage are detected and the gate of the transistor is driven by switching pulses having a frequency variable as a function of the deviation of the first DC output voltage and having a duration variable as a function of the deviation of the second DC output voltage.

Due to the actions of the first, second and third diodes, the field-effect transistor has a minimum turn-off time and a reduced switching loss. The control range of the DC-DC converter is therefore increased to maintain its output voltages over a wide range of input voltages and load currents. The reduced switching loss enables the converter to operate with high efficiency.

BRIEF DESCRIPTION OF THE DRAWINGS

The present invention will be described in further detail with reference to the accompanying drawings, in which.

DETAILED DESCRIPTION

Figure 1:
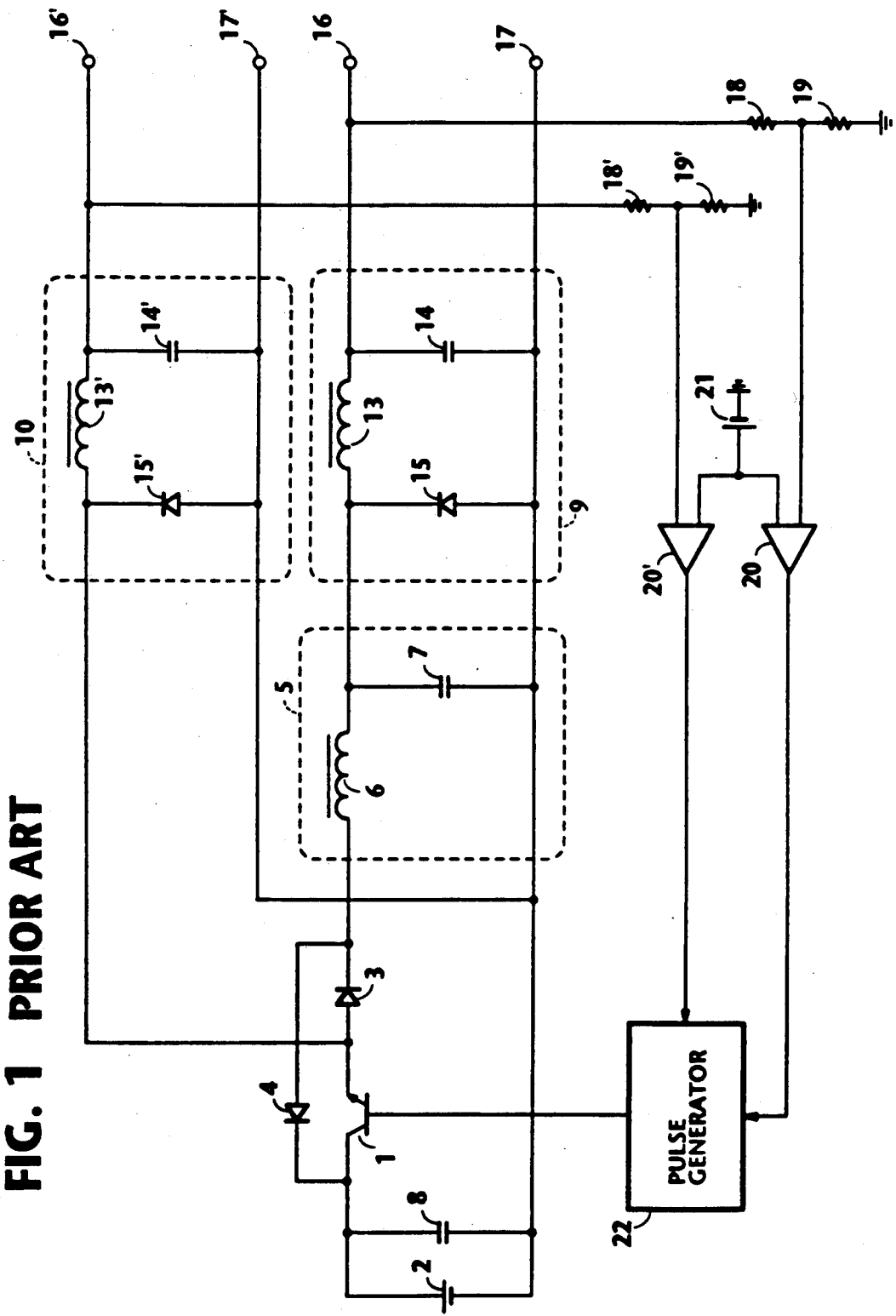
FIG. 1 is a block diagram of a prior art multi-output DC-DC converter.

Prior to the description of the present invention, reference is first made to FIG. 1 in which the aforesaid prior art multi-output prior art DC-DC converter is illustrated. The prior art converter comprises a bipolar transistor 1 having a collector-emitter path connected in a circuit leading from the positive terminal of an input DC voltage source 2 to the anode of a transistor 1 whose cathode is connected to one end of a inductor 6, the other end of which is connected through a capacitor 7 to the negative terminal of the voltage source 2. Inductor 6 and capacitor 7 form a series resonant circuit. A filter capacitor 8 is coupled across the voltage source 2. A voltage developed across capacitor 7 is applied to a first rectifier-tapering filter circuit 9 which comprises a filter inductor 13 and a filter capacitor 14 and a freewheeling diode 15. A second rectifier-filter 10 is provided which is formed of identical components 13', 14' and 15' to those of the first rectifier-filter. One input terminal of second rectifier-filter 10 is connected to the emitter of transistor 1 and the other input terminal is connected to the negative terminal of voltage source 2. The output of first rectifier-filter 9 appears across output terminal 16 and 17 and that of second rectifier-filter 10 appears across output terminals 16' and 17'. The output terminal 16 is connected to ground through a series-connected resistors 18 and 19 whose junction is coupled to the first input of an error amplifier, or differential amplifier 20, and the output terminal 16' is connected to ground through a series-connected resistors 18' and 19' whose junction is coupled to the first input of a differential amplifier 20'. To the second inputs of differential amplifiers 20 and 20' is applied a reference voltage from a voltage source 21. The outputs of differential amplifiers 20 and 20' are applied to a pulse generator 22 to supply switching pulses to the base of switching transistor 1, the frequency of the switching pulses being variable with the deviation of the voltage at the junction between resistors 18 and 19 with respect to the reference voltage and the duration of the switching pulses being variable with the deviation of the voltage at the junction between resistors 18' and 19' with respect to the reference voltage.

Figure 2:
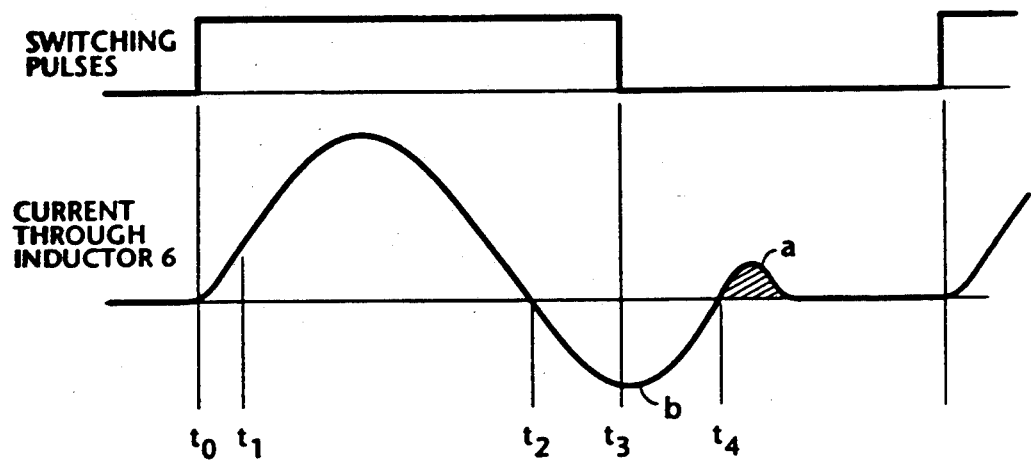
FIG. 2 is a waveform diagram associated with FIG. 1.

In response to the leading edge of a switching pulse, transistor 1 is turned on, allowing a current to flow through a reverse blocking diode 3 to resonant circuit 5. As illustrated in FIG. 2, during an initial period between $t_0$ and $t_1$, the current through inductor 6 rises linearly and in a subsequent period it oscillates at a frequency determined by the parameters of resonant circuit 5, supplying a sinusoidal positive halfwave current during $t_1$ and $t_2$ to first rectifier-filter 9 and generating a sinusoidal negative halfwave current during $t_2$ and $t_4$. This negative current flows backward to the voltage source 2 through a diode 4. Transistor 1 is turned off in response to the trailing edge of the switching pulse at $t_3$ which may occur anywhere between successive zero crossing points at $t_2$ and $t_4$. The first rectifier-filter 9 develops a DC output voltage which is proportional to the frequency of the switching pulse applied to transistor 1 and inversely proportional to the resonant frequency of resonant circuit 5. On the other hand, second rectifier-filter 10 develops a DC output voltage which is proportional to the duration of the switching pulse as well as to the switching frequency. By feedback control through differential amplifiers 20 and 20', the output of first rectifier-filter 9 is maintained at the reference voltage by controlling the frequency of the switching pulse and the output of first rectifier-filter 10 is maintained at the reference voltage by controlling the duration of the switching pulse.

Because of the speed limitations, bipolar transistor 1 is normally switched at 100 kHz. However, it is desired to provide switching at higher frequencies. In addition, a reverse current flows through diodes 3 and 4, voltage source 2 and diode 15', preventing transistor 1 from quickly switching to a turn-off state in response to the trailing edge of the switching pulse. This slow turn-off time considerably limits the range of pulse width control and causes a high switching loss, resulting in a reduced conversion efficiency. In the worst case, a variation of the output of the second rectifier-filter 10 would go beyond the control range.

Figure 3:
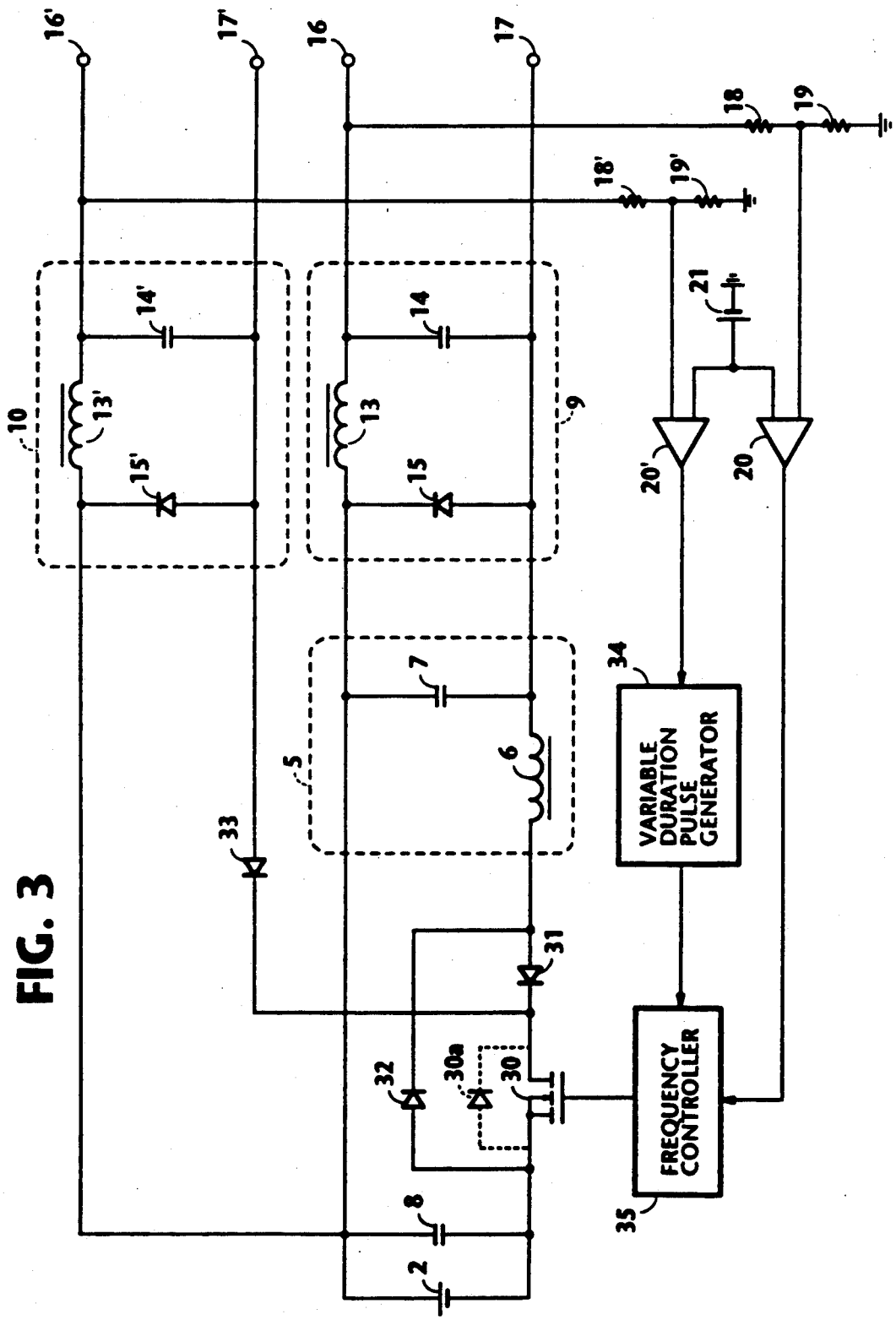
FIG. 3 is a block diagram of a multi-output DC-DC converter according to the present invention.

Referring now to FIG. 3, there is shown a multi-output DC-DC converter according to the present invention in which parts corresponding to those in FIG. 1 are marked with the same numerals as those in FIG. 1. The DC-DC converter of this invention comprises a field-effect transistor 30 which is capable of being switched at 2 MHz. FET 30 has an inherent parasitic diode 30a whose anode and cathode are coupled respectively to the source and drain of FET 30. The source of FET 30 is coupled to the negative terminal of input DC voltage source 2 and its drain to the cathode of a reverse blocking diode 31 whose anode is in turn coupled through resonant circuit 5 to the positive terminal of the DC voltage source 2. The source of FET 30 is also connected by a diode 32 to the anode of a diode 31 to produce a reverse current through the resonant circuit 5. Diode 31 has the effect of blocking the flow of reverse current which would otherwise flow through parasitic diode 30a. Diode 32 has a recovery time and a junction capacitance which are much smaller than those of parasitic diode 30a. Due to the reverse blocking effect of diode 31 and due to the use of such fast recovery diode 32, an undesirable positive halfwave current as indicated by a shaded area "a" in FIG. 2 does not flow through parasitic diode 30a during its recovery time immediately following the termination of a reverse current "b". This makes possible zero-current switching and minimizes the switching loss of the converter, allowing FET 30 to be switched at a frequency much higher than the prior art converter without significant heat loss.

One input of second rectifier-filter 10 is connected to the positive terminal of input voltage source 2 and the other input is connected through a reverse blocking diode 33 to the drain of FET 30. The use of diode 33 is to allow FET 30 to quickly turn off in response to the trailing edge of the switching pulse by blocking the current which would otherwise flow into rectifier-filter 10 through a first path consisting of diodes 32 and 31 and through a second, parallel path consisting of parasitic diode 30a when FET 30 is in turn-off state. The blocking of such a current by diode 33 enables FET 30 to be turned off quickly in response to the trailing edge of the gate pulse and reduces its switching loss. This increases the range of pulse width control for the second rectifier-filter 10. The output of the second rectifier-filter 10 can therefore be maintained at a desired value for a wide range of variations in the input DC voltage and a wide range of load current variations.

Figure 4:
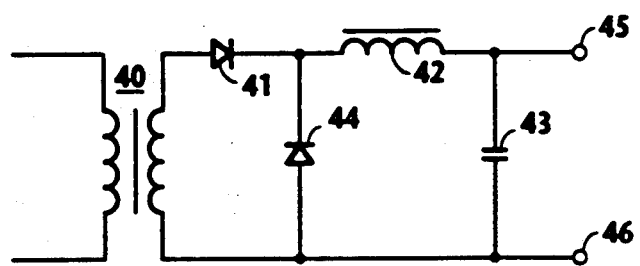
FIG. 4 is a circuit diagram of a forward converter.

Each of the rectifier-filters can be replaced with a forward converter which, as shown in FIG. 4, comprises a transformer 40, one end of the secondary winding of transformer 40 being coupled through a free wheeling diode 41 and a filtering inductor 42 to a positive output terminal 45 and the other end to a negative output terminal 46. A filtering capacitor 43 is coupled across output terminals 45, 46 and another freewheeling diode 44 is connected across inductor 42 and capacitor 43.

The output of differential amplifier 20' is applied to a variable duration pulse generator 34 to generate variable duration pulse as a function of the deviation of the DC output voltage of the second rectifier-filter 10 and the output of differential amplifier 20 is applied to a frequency controller 35 which controls the frequency of the pulses supplied from pulse generator 34 as a function of the deviation of the DC output voltage of the first rectifier-filter 9.

Figure 5:
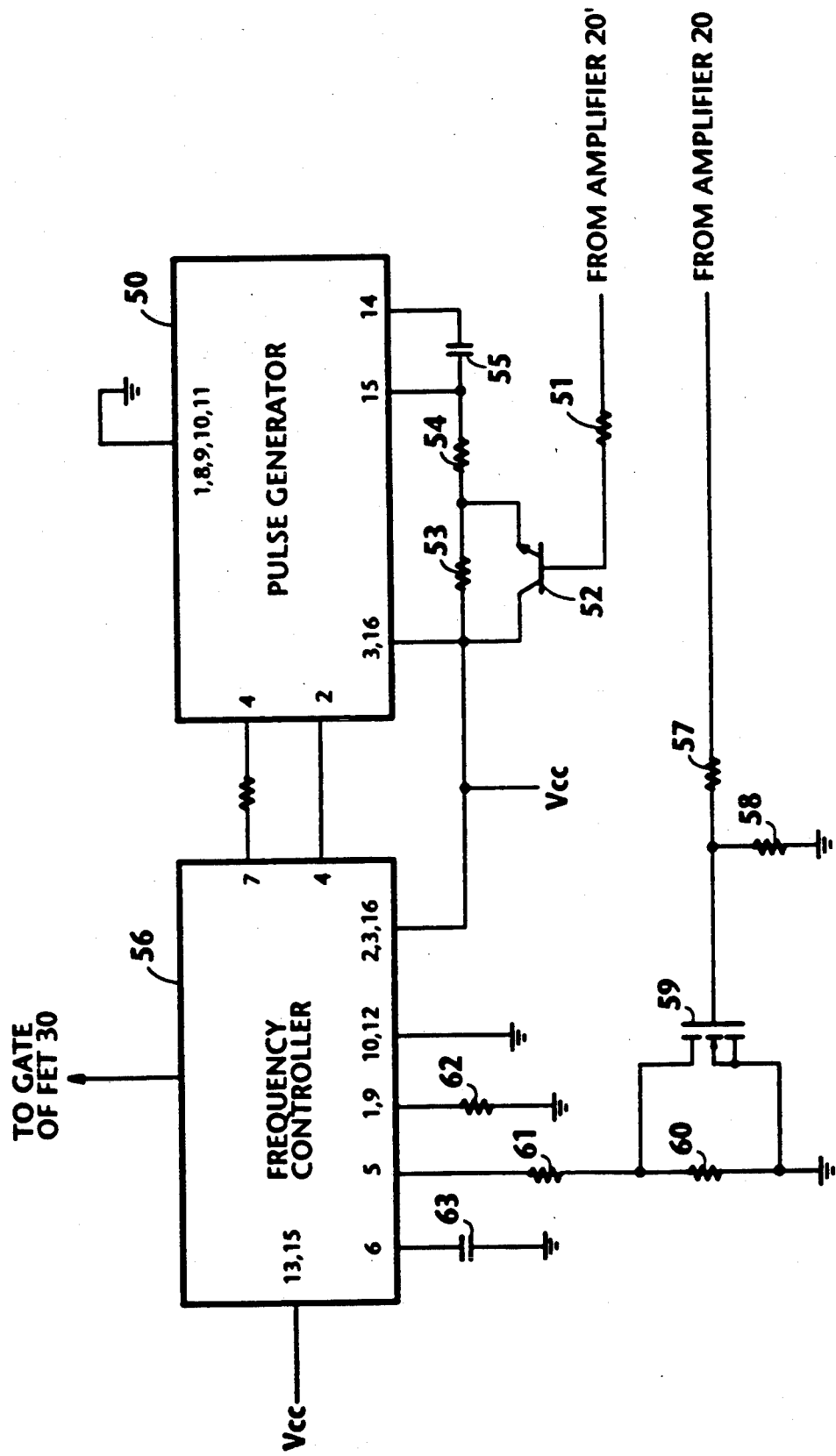
FIG. 5 is a circuit diagram of the pulse generator and frequency controller of FIG. 3.

FIG. 5 shows details of the pulse generating circuitry of the present invention. For variable duration pulse generator 34 use is made of a pulse generator 50 which is commercially available as μPC74HC123AC from NEC Corporation. The output of differential amplifier 20' is coupled through a resistor 51 to the base of a bipolar transistor 52 whose emitter-collector path is shunted with a resistor 53 which is connected in series with a resistor 54 and a capacitor 55. Transistor 52 serves as a variable resistance element which varies with the voltage applied to the base from amplifier 20'. The emitter of transistor 52 is connected to the #16 pin terminal of pulse generator 50 and the terminals of capacitor 55 are coupled respectively to #14 and #15 pin terminals as parameters for determining the duration of pulses generated by the pulse generator 50.

For frequency controller 35 use is made of an integrated circuit chip 56 which is commercially available as UC3825 from Unitrode Inc,. The output of amplifier 20 is coupled to ground through series-connected resistors 57 and 58, whose junction is applied to the gate of a field-effect transistor 59. Resistors 60 and 61 are connected in series between #5 pin terminal of the IC chip 56 and ground, with resistor 60 being further connected in parallel with the source-drain path of transistor 59. A grounded resistor 62 is connected to #1 and #9 pin terminals of the IC chip and a grounded capacitor 63 is connected to #6 pin terminal of the IC chip. The #7 pin terminal of the IC chip is connected through a resistor 64 to #4 pin terminal of pulse generator 50 and #4 pin terminal of the IC chip is connected direct to #2 pin terminal of pulse generator 50. FET 59 is a variable resistance element which varies with the voltage supplied from amplifier 20. The components coupled to #5 and #6 pin terminals of frequency controller 56 determine the frequency of pulses which are supplied from the frequency controller 56. Controller 56 receives variable duration pulses from pulse generator 50 and controls the frequency of the pulses according to the output of amplifier 20.

What is claimed is:

1. A multi-output DC-DC converter comprising:
   a field-effect transistor having a source-drain path connected to a first terminal of an input DC voltage source, said transistor having a parasitic diode coupled in parallel relationship therewith;
   a resonant circuit coupled at one end to a second terminal of said DC voltage source;
   a first diode connected between the source-drain path of said transistor and the other end of said resonant circuit to allow current to flow therein in a forward direction;
   a second diode connected in parallel with a series circuit formed by the source-drain path of said transistor and said first diode to allow current to flow in a reverse direction, said second diode having a recovery time much smaller than the recovery time of said parasitic diode;
   first rectifier-filter means coupled to said resonant circuit for developing a first DC output voltage;
   second rectifier-filter means coupled across the first and second terminals of said DC voltage source through said transistor for developing a second DC output voltage;
   a third diode connected between said DC voltage source and said second rectifier-filter means for blocking a current flow which would otherwise flow through said first and second diodes and said second rectifier-filter means;
   means for detecting deviations of said first and second DC output voltages respectively from a reference voltage; and
   means for supplying to the gate of said transistor switching pulses having a frequency variable as a function of the deviation of said first DC output voltage and having a duration variable as a function of the deviation of said second DC output voltage.

2. A multi-output DC-DC converter as claimed in claim 1, wherein said second diode has a junction capacitance much smaller than the junction capacitance of said parasitic diode.

* * * * *